United States Patent

Michaelsen

[15] 3,673,865

[45] July 4, 1972

[54] METHOD AND APPARATUS FOR ORTHOGONAL VARIABLES

[72] Inventor: Alfred L. Michaelsen, New York, N.Y.

[73] Assignee: Westvaco Corporation, New York, N.Y.

[22] Filed: April 21, 1971

[21] Appl. No.: 136,138

[52] U.S. Cl. ............................................. 73/159, 162/198
[51] Int. Cl. ............................................. G01n 33/34
[58] Field of Search ............... 73/150, 159, 37.5, 432 R; 162/259, 263, 198

[56] References Cited

UNITED STATES PATENTS

| 3,016,460 | 1/1962 | Andressen | 73/150 |
| 3,552,203 | 1/1971 | Fresh | 73/159 |
| 3,562,500 | 2/1971 | Grant | 162/263 |
| 3,634,187 | 1/1972 | Charictal | 162/263 |

*Primary Examiner*—S. Clement Swisher
*Attorney*—Richard L. Schmalz

[57] ABSTRACT

A method and apparatus for indicating a property of sheet of material of substantial width traveling at a high speed. Two sensors for sensing the property are mounted side by side so that they are simultaneously moved across the traveling sheet. The two sensors enable easy differentiation between variations in the cross direction and machine direction.

10 Claims, 9 Drawing Figures

INVENTOR.
ALFRED L. MICHAELSEN

BY Richard T. Schmalz

ATTORNEY

METHOD AND APPARATUS FOR ORTHOGONAL VARIABLES

BACKGROUND OF THE INVENTION

1. Field to which the Invention Pertains

Numerous manufacturing processes produce a material in the form of a continuous sheet, e.g. paper machines, continuous steel casting machines and sheet steel rolling mills. In such processes, the sheet produced is usually substantially continuous and has a relatively large width, e.g. 5 to 20 feet. Further, it is generally desired that certain parameters relating to the sheet be maintained within a close tolerance, e.g. the thickness of the sheet. Hence, in such processes, it becomes necessary to measure a variable of interest. However, in trying to effect such a measurement, a problem is presented in that the sheet is continuously moving. Moreover, variations in the parameter of interest may occur either in the direction of movement of the sheet (the machine direction or MD) or perpendicular to the direction of movement (the cross machine direction or CD) or some combination of the two.

Thus, in a typical manufacturing operation producing a continuous sheet of material, a single sensor may traverse the sheet in the cross machine direction while the sheet continually passes below the sensor moving in the machine direction. As a result, if changes in the variable of interest are detected, one is faced with the problem of determining whether the change arises from a CD variation or a MD variation or a combination of the two. A solution of this problem is the field to which this invention pertains.

2. Prior Art

Exemplary of processes of the type heretofore discussed is the process of manufacturing paper on a fourdrinier paper machine. In such a process, a dilute aqueous slurry of cellulose fibers is continuously deposited upon a moving foraminous belt referred to as the fourdrinier wire. After a substantial amount of water is drained away through the foraminous belt, the formed paper sheet or web leaves the belt and proceeds through numerous sequential processing units which act upon the sheet to control the variables of interest, e.g. thickness, moisture content, finish, etc.

A solution to the measurement problem described above is particularly difficult yet quite necessary in the manufacture of paper since the paper web is generally quite wide, for example 20 feet, and travels at a high velocity, for example 2,500 feet per minute or approximately 30 mph. Moreover, different mechanisms are used to control CD variations as opposed to MD variations. For example, one variable of interest in the manufacture of paper is the basis weight or weight per unit area of the web. To correct for purely CD variations in the basis weight, incremental changes are made across the width of the slice or opening through which the aqueous slurry passes immediately prior to being deposited upon the fourdrinier wire. Alternatively, to effect an MD change in the basis weight, the total head in the headbox which gives rise to the flow of the slurry from the headbox might be manipulated.

The prior art generally recognized the problem of attaching directional significance to the measurement of a particular variable such as basis weight. In order to solve this problem, numerous expedients were resorted to the use of which were attended by certain disadvantages.

For example, one approach used by the prior art to measure either the basis weight of a paper web produced on a paper machine was to connect a XY recorder to a measuring transducer which traversed the sheet in the cross machine direction. The Y axis on the recorder represented the variable of interest and the X axis represented the sheet width. Thus, as the measuring transducer moved back and forth across the sheet in the cross machine direction, there was produced on the recorder a series of curves which could be visually compared by the operator to try and evaluate changes in the variable of interest. However, it will be appreciated that since the sheet was continuously moving in the machine direction, a curve produced on the recorder did not represent a true CD profile because, as the sensor moved in the CD direction and the sheet moved in the MD direction, the path described by the measuring point was a diagonal line running across the sheet. The angle, $\theta$, between this diagonal path and the cross machine direction would of course be defined by $\theta = $ arc tan (MD Sp./CD Sp.), where MD Sp. = the velocity of the sheet, and CD Sp. = the velocity of the sensor across the sheet.

From the above description it will be appreciated that the approach of using an XY recorder did not provide the machine operator with any information as to the actual CD and MD variation of the variable of interest. Rather, the operator was only provided with a composite of CD and MD changes of the variable of interest which composite was affected by the machine speed, the speed at which the measuring transducer traversed the sheet, and the manner in the variable of interest varied.

Another approach resorted to by the prior art was to connect the sensor to a digital computer and use, essentially, digital filtering techniques as an attempt to resolve a sequence of readings into orthogonal components, i.e. to resolve the sensor readings into CD and MD components. The result of the calculation routines used was displayed either digitally or in analog form. While such an approach provided a manageable solution to the problem, the resulting information was, at best, only an approximation of the actual CD and MD variations. Moreover, substantial programing and machine calculation time was required to produce these approximations.

The measurement and associated control problem discussed above was considered by A.B. Bishop in a paper entitled *Techniques For Real-Time Determination Of The Components Of Variance For Control Of Continuous-Sheet Processes* (Joint Automatic Control Conference — 1963) wherein it was proposed that a digital computer be employed to operate upon sensor readings using the variance equation. In order to take full advantage of this approach, it was proposed therein that dual or multiple sensors be employed, i.e. either two sensors wherein one sensor is stationary at some position on the machine and the second sensor is moveable across the machine in the CD or, three sensors wherein two sensors are stationary and one sensor is moveable across the machine in the CD. Of course, the disadvantage of the latter approach is that it requires three sensors and the disadvantage of either approach is that substantial programming and computer calculation time is required to obtain, at best, only an approximation of the CD and MD variations of the parameter of interest. These disadvantages and the disadvantages of the other prior art approaches to this general problem are substantially overcome by the use of my invention.

SUMMARY OF THE INVENTION

Rather than using a single sensor or dual stationary - moveable sensors to measure the variable of interest, two sensors are tandemly aligned in the cross machine direction and both traverse the sheet in the cross machine direction. At desired intervals, the output of the two sensors are simultaneously read. The difference between any two readings represents the cross machine direction change of the variable of interest over the distance between the sensors.

Subsequent to the first two readings, the sensors may be moved and the output of both of the two sensors may again be simultaneously read. The difference between this second pair of readings again represents the cross machine direction change of the variable of interest over the distance between the sensors.

If one of the first pair of points is aligned in the MD with one of the second pair of points, any difference associated with the reading for such points will represent the change of the variable of interest in the machine direction.

DETAILED DESCRIPTION

Figure 1:
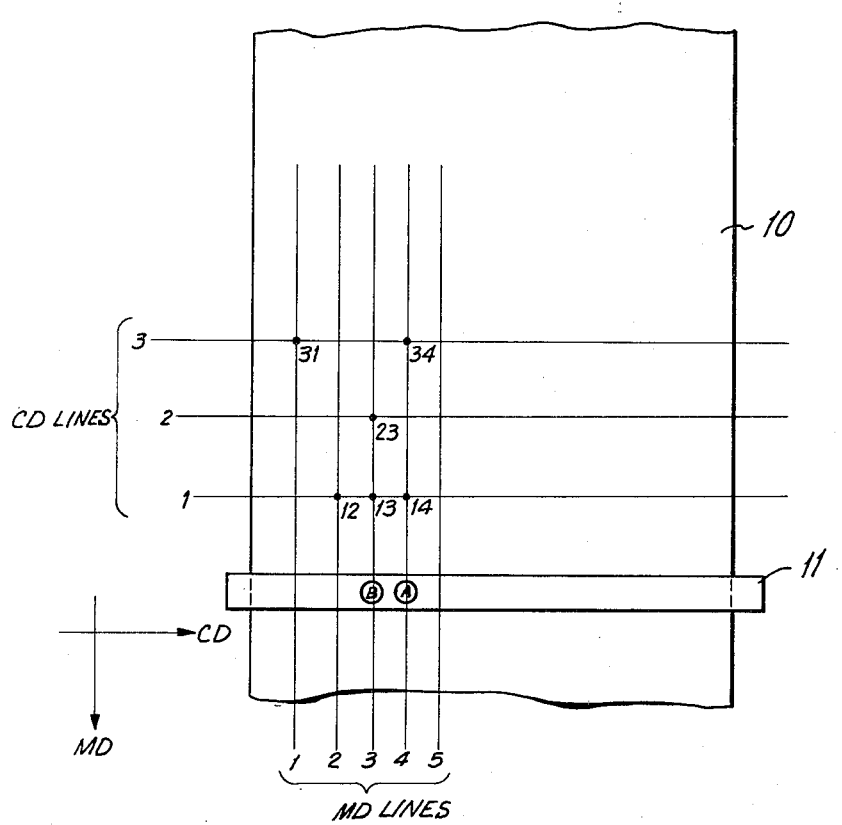
FIG. 1 is a schematic representation of one approach to the practice the invention disclosed herein.

Referring to FIG. 1, there is shown schematically and in plan view a continuous sheet of material 10 moving in the direction indicated by the arrow labeled MD. Disposed over the sheet 10 is a frame 11 on which two sensors A and B are movably mounted. Sensors A and B are tandemly aligned in the cross machine direction. Although sensors A and B are movable in the cross machine direction, they are preferably maintained a fixed distance apart. Means for moving the sensors, such as a traversing motor, are not shown but are well known.

Solely for purposes of reference, a number of lines in the machine direction (MD) have been designated in FIG. 1, e.g. 1, 2, 3, 4, and 5. Similarly, hypothetical lines across the sheet in the CD direction are also indicated, e.g. 1, 2, and 3. Thus, these various lines may be viewed as establishing a set of cartesian coordinates whereby particular points on the sheet may be located. For example, using a two digit system, point 14 would be located at the intersection of line 1 in the CD direction and line 4 in the MD direction.

Assuming, by way of example and not by way of limitation, that the sheet 10 shown in FIG. 1 is a sheet of paper and the variable of interest being measured by the sensors A and B is the basis weight of the paper, the practice of my invention may be understood by reference to the coordinate systems described above. Thus, assume that at a point in time when the hypothetical CD line 1 passes beneath the sensors A and B, the sensors A and B are over MD lines 4 and 3 respectively. At that point in time, the output of sensors A and B is simultaneously read thus effecting a basis weight measurement of the sheet at points 13 and 14. Since the output of sensors A and B are read simultaneously, it will be appreciated that the CD change in basis weight from MD line 3 to MD line 4 along CD line 1 would be defined by the following relation.

$$CD^1{}_{3-4} = B_{13} - A_{14}$$

Next, assume that at the point in time when the hypothetical CD line 2 passes under the frame 11, sensors A and B are at positions 5 and 4 respectively. If, at this time, the output of sensors A and B are simultaneously measured, the resulting measurements will represent the basis weight of the sheet at points 25 and 24 respectively. The CD change in basis weight from point 24 to point 25 along line 2 will be defined by $$CD^2{}_{4-5} = B_{24} - A_{25}$$

Moreover, it will be appreciated that in the above examples, MD line 4 is common to both pairs of measurements. Therefore, if, at the time the first measurement was made, the signal representing the basis weight at the point 14 was stored in a memory system, the stored value could be compared with subsequent measurements along the MD line 4 and a measurement of the MD change in basis weight along MD line 4 could thus be achieved. For example, using the two pairs of measurements in the above example, the change in the basis weight along MD line 4, from CD line 1 to CD line 2, would be defined by $$MD^4{}_{1-2} = A_{14} - B_{24}$$

By continuing the process of simultaneously measuring the basis weight at two points on the sheet, wherein the two points are aligned in the cross machine direction, one may obtain a segmented profile of the basis weight or the change in basis weight, in the cross machine direction. Additionally, by storing the various simultaneous measurements in a memory, subsequent subtraction operations can be utilized to obtain a segmented profile of the basis weight, or the change in basis weight, in the machine direction. By appropriately displaying the two resulting profiles, changes in the variable of interest may be observed exclusively with reference to either the machine direction or the cross machine direction.

The preferred embodiment of my invention would utilize a digital computer operatively connected to the measuring transducer system. Through this approach, several advantages may be realized. For example, the computer would inherently provide the means for effecting the various arithemetic computations as well as the required memory system for storing the signals representative of the various measurements. The preferred readout for displaying the various measurements and computational results would be a large screen, dual trace, high presistency, cathode ray tube (CRT). Utilizing such an apparatus arrangement, the following examples will indicate the advantages which attend the practice of my invention as opposed to the prior art approach of employing a single transducer or mixed movable transducers.

Figure 2:
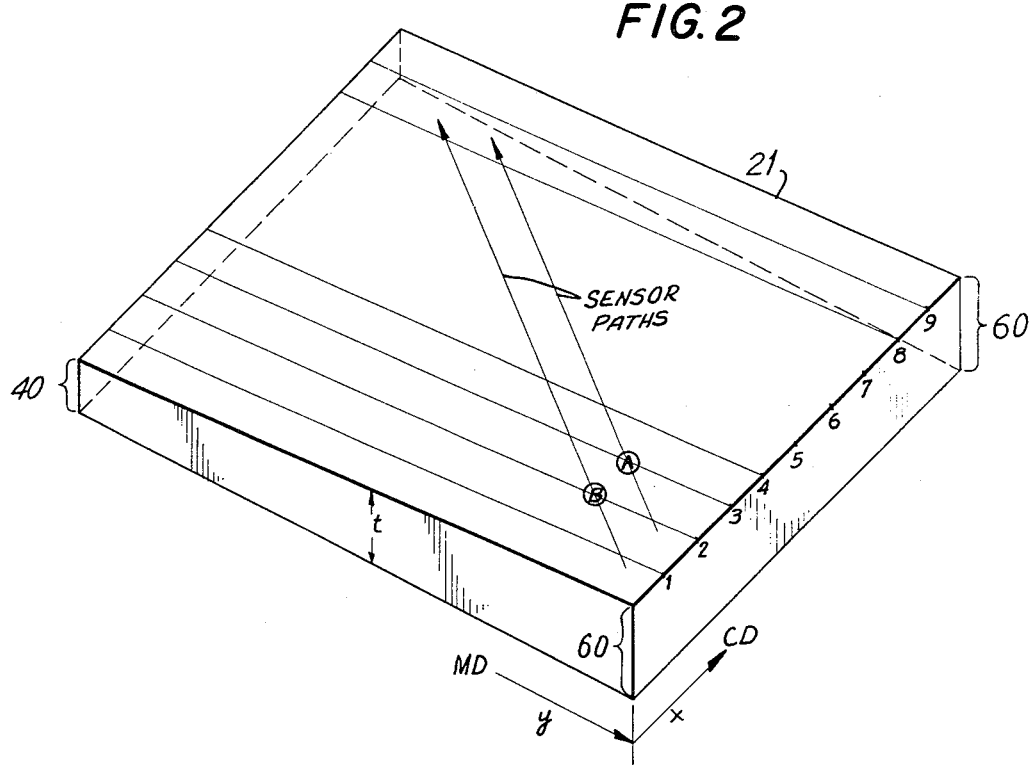
FIG. 2 is a section of a hypothetical sheet of material.
Figure 3A:
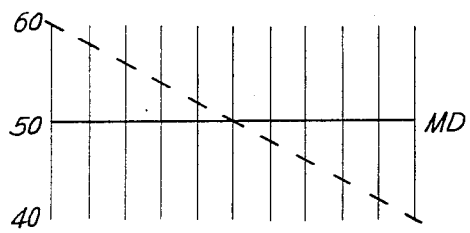
FIGS. 3A and 3B are representations of one type of display which may be used when practicing my invention with respect to the sheet of FIG. 2.
Figure 3B:
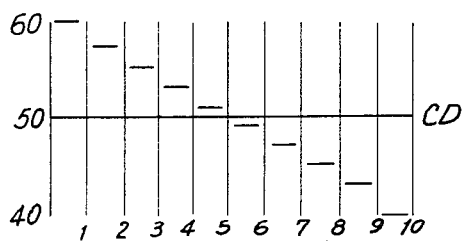

Referring to FIG. 2, there is shown a section of hypothetical sheet of material, said section representing a portion of a continuous sheet of material. The CD or X and MD or Y directions of the sheet are as indicated. For reference, the sheet is broken down into CD segments by MD lines 1–9. Further, it will be assumed that the variable of interest is the thickness ($t$) or caliber of the sheet and the desired thickness, in whatever units are appropriate, is 50. Thus, it will be observed that the hypothetical section has no CD thickness variation ($dt/dx=0$) but diminishes uniformly in the machine direction ($dt/dy=$constant). Still further, let it be assumed that the sheet segment 21 shown in FIG. 2 passes beneath the apparatus arrangement shown in FIG. 1 and a sequence of measurements are effected by the sensors A and B as the sheet 21 passes beneath the sensors. FIG. 3A and FIG. 3B indicate one type of readout which may be obtained on an appropriate CRT to display the results of the various measurements and computations. Thus, in both FIG. 3A and FIG. 3B, the ordinate represents the thickness of the sheet.

Referring first to FIG. 3B, there is depicted the display which would be associated with the measurements and computations pertaining to CD variations. Since CD variations would occur between, what was previously referred to as, MD lines, the vertical lines which comprise the grid of the display depicted in FIG. 3B represent MD lines, as heretofore defined. Referring further to FIG. 3B, there is shown the segmented profile resulting from the simultaneious CD measurements of the thickness of the sheet. As may be noted, all of the line segments are horizontal indicating that there is no point to point variation of the thickness of the sheet purely in the cross machine direction which, of course, corresponds to the geometry of the sheet as shown in FIG. 2.

FIG. 3A depicts the display which would be associated with the measurements and computations pertaining to MD variations of the sheet shown in FIG. 2. Since MD changes occur along MD lines, the vertical lines which comprise the grid of the display are the analog of MD lines on the sheet and MD changes in the thickness may be represented by line segments through the aforementioned vertical lines. If no change had occurred in the MD, the associated line segment would be horizontal. Alternatively, if a change has occurred, the direction and magnitude of the change will be indicated by the slope of the line segment. Using this particular display approach, it would be apparent to the operator, inspecting the display shown in FIG. 3A, that the thickness is uniformly diminishing in the MD direction which is consistent with the geometry specified for the hypothetical sheet shown in FIG. 2.

Thus, in summary, were an operator to inspect the displays shown in FIGS. 3A and 3B, the geometry of the sheet would immediately be apparent notwithstanding the fact that only a single scan had been effected.

Figure 4:
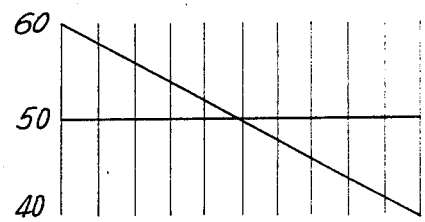
FIG. 4 is a representation of the type of display and information conveyed if the sheet of FIG. 2 was measured using a prior art approach.

As contra-distinguished from the displays shown in FIGS. 3A and 3B, which displays would result from the practice of my invention, the display shown in FIG. 4 is of the type which would be realized by employing the prior art approach of scanning the sheet with only a single sensor. Thus, the single sensor approach would provide, either on a CRT or a direct writing recorder, a single diagonal line. As will hereinafter be pointed out, little, if any reliable information can be derived from this single trace.

Referring to FIG. 5, there is again shown a section of hypothetical sheet of material. However, as opposed to the section shown in FIG. 2, it will be observed that the section 22 of FIG. 5 has a geometry such that there is no variation in the thickness in the machine direction ($dt/dy$=0) however, the thickness linearly decreases in the cross machine direction ($dt/dx$=constant).

Figure 5:
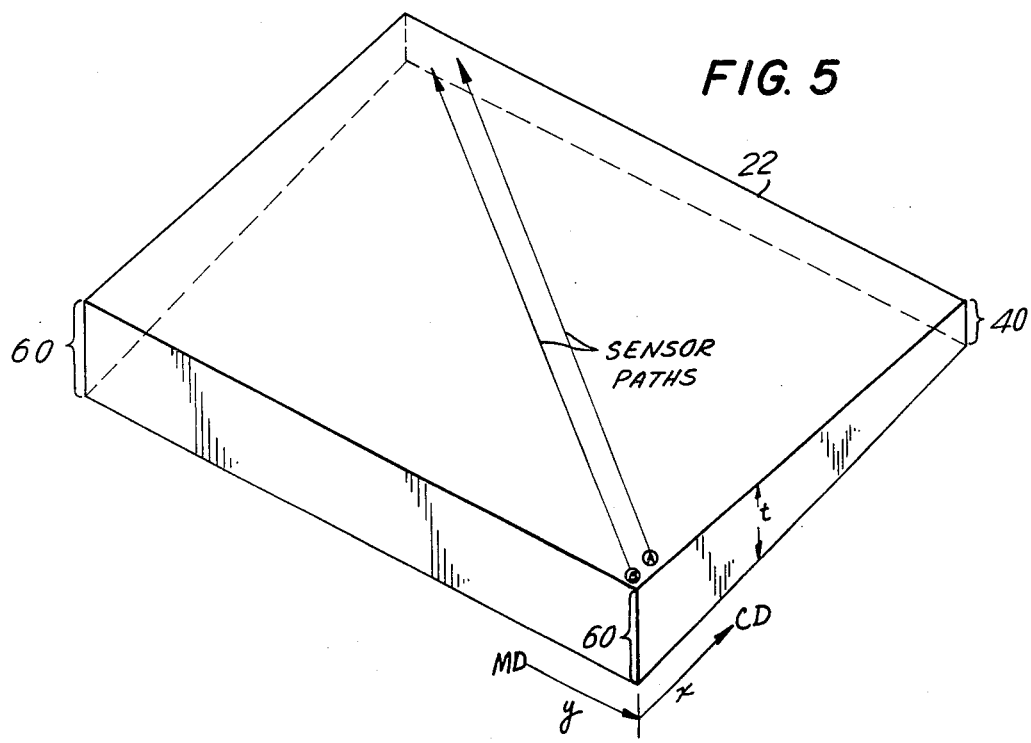
FIG. 5 is a section of another hypothetical sheet of material.
Figure 6A:
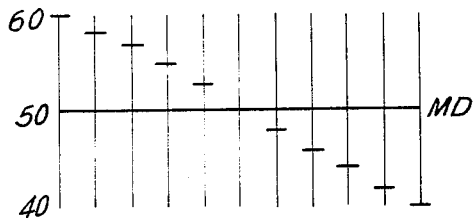
FIGS. 6A and 6B are representations of one type of display which may be used when practicing my invention with respect to the sheet of FIG. 5.
Figure 6B:
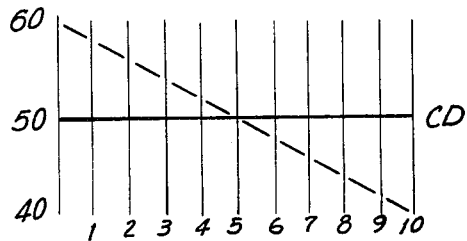

Once again, it will be assumed that the section 22 shown in FIG. 5 is passed beneath a pair of sensors of the type and arrangement previously shown and described with respect to FIG. 1. Assuming further that an apparatus arrangement of the type previously described, e.g. a digital computer in conjunction with a dual trace CRT is utilized, the display resulting from the measurements and computations might appear as shown in FIG. 6A and FIG. 6B. With reference to FIG. 6A, the segmented profile of changes in the thickness of the sheet in the machine direction is displayed. The various horizontal line segments for each MD line indicates that along any particular MD line there has been no change in thickness. This result is, of course, consonant with the geometry defined for the section 22 shown in FIG. 5.

FIG. 6B indicates one type of display which may be utilized to portray the results of the measurement and computations with respect to determining the change in thickness of the sheet shown in FIG. 5 in the cross machine direction. Thus, it will be observed that between each MD line there is shown a straight but sloping display. Obviously, each such sloping line indicates a change in the thickness of the sheet in the CD direction with the slope of the line indicating the direction and magnitude of change. From an overall inspection of the display presented in FIG. 6B, it will be apparent that the measurements and computations indicate a continually diminishing thickness in the cross machine direction. Once again, this is consonant with the geometry specified for the sheet. Moreover, it will be appreciated that the displays of FIGS. 6A and 6B are produced, essentially, simultaneously with the result that, at the end of one scan, the operator will have a complete representation of the geometry of the sheet for the section shown in FIG. 5.

Figure 7:
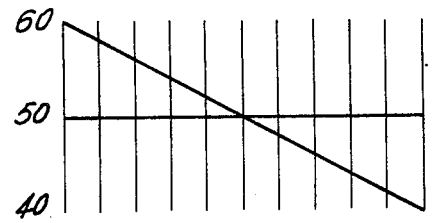
FIG. 7 is a representation of the type of display and information conveyed if the sheet of FIG. 5 was measured using a prior art approach.

For purposes of comparison, FIG. 7 displays the readout which would be obtained if the prior art method of utilizing a single sensor was employed with respect to the section 22 of FIG. 5. As a single sensor traversed the section 22 shown in FIG. 5, the display shown in FIG. 7 would be generated. Once again, it will be appreciated that the display shown in FIG. 7 conveys far less information than the combination of the displays shown in FIGS. 6A and B. Moreover, it is instructive to compare the display of FIG. 7 with the display of FIG. 4 wherein it will be perceived that the two displays are identical. Thus, for the admittedly abstract sections shown in FIGS. 2 and 5, it will be appreciated that the prior art approach of using a single sensor produces a display from which it would be impossible, given a single trace, to differentiate between the section shown in FIG. 5 and the section shown in FIG. 2. However, it will be clearly evident that, through the practice of my invention, the resulting dual display provides sufficient information to differentiate between the two sections after only a single scan.

While the foregoing examples set forth the preferred embodiment of my invention, it will be understood that the nature of the "read-out" utilized above is merely an illustrative in that a wide variety of read-out mechanisms could be employed, e.g. a digital presentation generated by a typewriter or various other forms of analog presentation. Having obtained the desire information by the utilization of my invention, the skilled art worker may select the read-out which would appear to be preferable.

Additionally, it will be appreciated that the method and apparatus disclosed herein provides a signal or signals which may be used for control purposes. For example, through the use of my invention, the cross machine direction profile of a sheet may be determined. Once this profile has been ascertained, control mechanisms, well known to the skilled art worker, may be employed to alter or correct the profile. By way of illustration, in U.S. Pat. No. 3,413,192 there is disclosed an apparatus for controlling the cross machine direction properties of a sheet of paper being manufactured on a fourdriner paper machine. Since the input to the control system disclosed in U.S. Pat. No. 3,413,192 is a signal or signals representative of the cross machine direction profile of the sheet, such an apparatus could be utilized in conjunction with my invention to achieve cross machine direction control of the measured parameter. Similarly, U.S. Pat. No. 3,552,203 discloses that machine direction control of the basis weight of a paper sheet may be effected by manipulation of the thick stock flow control valve in response to a signal or signals representative of the machine direction change of the basis weight. Thus, in conjunction with such a control system, the practice of my invention would provide machine direction control.

Further, it may be observed that the above description of my invention is described without reference to a particular type of sensor since the skilled art worker utilizing my invention would select sensors appropriate for the variable of interest. For example, within the paper industry, numerous commercially available and well known systems are utilized to measure such parameters as the basis weight and moisture content. Since the sensor systems are generally well known within a particular industry and since my invention is generally applicable and has utility irrespective of the particular parameter of interest, a detailed description of appropriate measuring systems has been omitted.

Although there has been set forth herein the preferred embodiment of my invention as well as examples of how my invention might be employed, it will be appreciated that, without departing from the scope of my invention, numerous other embodiments of my invention will be perceived by the workers skilled in a particular art to which my invention is applicable.

I Claim:

1. In combination with an apparatus for producing a substantially continuous sheet of material, a system for measuring the cross machine direction change of a parameter of said sheet which comprises:

a. a frame, mounted on said machine in the cross machine direction;
   b. a first sensor and a second sensor movably mounted on said frame and tandemly aligned in the cross machine direction and providing first and second output signals proportional to said parameter;
   c. means for moving said sensors along said frame in the cross machine direction;
   d. means for simultaneously detecting said first and second output signals and providing a first difference signal proportional to the difference between said first and second output signals whereby said first difference signal is proportional to the cross machine direction change of said parameter.

2. The system of claim 1 wherein said means for moving said sensors moves said first sensor and said second sensor at the same distance per unit time.

3. The system of claim 1 further including display means for displaying the value of said first difference signal.

4. The system of claim 3 wherein said display means is a cathode ray tube.

5. The system of 1 which further includes:
   a. means for providing a third signal representative of the desired cross machine direction change of said parameter;
   b. means for comparing said third signal and said first difference signal to provide a second difference signal; and
   c. means for controlling the cross machine direction change of said parameter in response to said second difference signal.

6. On an apparatus for producing a substantially continuous sheet of material, the process of determining the cross machine direction change of a parameter of said sheet comprising:
   a. simultaneously generating a first signal and a second signal wherein said first signal and said second signal are representative of the value of said parameter at a first point and a second point, respectively, wherein said first point and said second point are aligned in the cross machine direction; and
   b. comparing said first and second signal to generate a first difference signal, whereby said first difference signal is representative of the cross machine direction change of said parameter.

7. The process of claim 6 which further includes the steps of controlling the cross machine direction change of said parameter in response to said first difference signal.

8. On an apparatus for producing a substantially continuous sheet of material, the process of determining the cross machine direction change and the machine direction change of a parameter of said sheet comprising:
   a. simultaneously generating a first signal and a second signal wherein said first signal and said second signal are representative of the value of said parameter at a first point and a second point on said sheet, respectively, wherein said first point and said second point are aligned in the cross machine direction;
   b. comparing said first and second signal to generate a first difference signal;
   c. generating a third signal representative of said parameter at a third point on the sheet, said third point being aligned in the machine direction with said first point; and
   d. comparing said first signal and said third signal to obtain a second difference signal whereby said first difference signal is representative of the cross machine direction change of said parameter and said second difference signal is representative of the machine direction change of said parameter.

9. The process of claim 8 which further includes the steps of:
   a. controlling the cross machine direction change of said parameter in response to said first difference signal.
   b. controlling the machine direction change of said parameter in response to said second difference signal.

10. On an apparatus for producing a substantially continuous sheet of material, the process of determining the cross machine direction change and the machine direction change of a parameter of said sheet comprising:
   a. simultaneously generating a first pair of signals wherein said first pair of signals is representative of the value of said parameter at a first pair of points, said first pair of points being aligned in the cross machine direction;
   b. simultaneously generating a second pair of signals wherein said second pair of signals is representative of the value of said parameter at a second pair of points, said second pair of points being aligned in the cross machine direction and at least one of said second pair of points being aligned in the machine direction with at least one of said first pair of points;
   c. generating a first difference signal representative of the difference between the two signals which comprised said first pair of signals; and
   d. generating a second difference signal representative of the difference between the signal in said second pair of signals and the signal in said first pair of signals which represent the two points aligned in the machine direction, whereby said first difference signal is representative of the change of said parameter in the cross machine direction and said second difference signal is representative of the change in said parameter in the machine direction.

* * * * *